(12) United States Patent
Uesaka

(10) Patent No.: US 8,431,644 B2
(45) Date of Patent: Apr. 30, 2013

(54) RUBBER COMPOSITION AND TIRE

(75) Inventor: Kenichi Uesaka, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 434 days.

(21) Appl. No.: 12/607,635

(22) Filed: Oct. 28, 2009

(65) Prior Publication Data

US 2010/0105826 A1     Apr. 29, 2010

(30) Foreign Application Priority Data

Oct. 29, 2008 (JP) ................. 2008-278779

(51) Int. Cl.
*C08K 3/34* (2006.01)
*C08L 37/00* (2006.01)

(52) U.S. Cl.
USPC .......................................... 524/492; 524/548

(58) Field of Classification Search ............ 524/492
See application file for complete search history.

(56) References Cited

U.S. PATENT DOCUMENTS

| 6,294,624 | B1 | 9/2001 | Inoue et al. | |
|---|---|---|---|---|
| 6,693,160 | B1 * | 2/2004 | Halasa et al. | ............... 526/338 |
| 2004/0063884 | A1 | 4/2004 | Halasa et al. | |
| 2006/0047056 | A1 | 3/2006 | Miyazaki | |

FOREIGN PATENT DOCUMENTS

| EP | 1714984 A1 | 10/2006 |
|---|---|---|
| JP | 2000-344955 | 12/2000 |
| JP | 2003-192842 | 7/2003 |
| JP | 2006-063143 | 3/2006 |

* cited by examiner

*Primary Examiner* — Hui Chin
(74) *Attorney, Agent, or Firm* — Birch, Stewart, Kolasch & Birch, LLP

(57) ABSTRACT

The present invention has its object to provide a rubber composition that can be used for a tread to supply a tire having both low heat build-up property and good wet grip performance. The present invention relates to a rubber composition including: silica and a rubber component that contains a modified butadiene rubber having a vinyl content of 35% by weight or less and having, in a main chain thereof, a constitutional unit derived from a specific nitrogen-containing compound, wherein an amount of the modified butadiene rubber is 5 to 45% by weight per 100% by weight of the rubber component, and wherein an amount of the silica is 10 to 150 parts by weight per 100 parts by weight of the rubber component.

10 Claims, No Drawings

RUBBER COMPOSITION AND TIRE

TECHNICAL FIELD

The present invention relates to a rubber composition and a tire having a tread prepared using the rubber composition.

BACKGROUND ART

Many studies have conventionally been made to reduce fuel consumption by reducing rolling resistance (expressed also as "by improving rolling resistance performance") of tires. Further reduction in fuel consumption of automobiles has been more and more strongly required in recent years, and a rubber composition for a tread among various tire components, which occupies a large portion of a tire, is required to be more excellent in low heat build-up property.

Known as a method for sufficiently improving low heat build-up property of a rubber composition is a method in which the amount of a reinforcing filler in the rubber composition is reduced. In this case, however, hardness of the rubber composition decreases and thereby the tires obtained are softened, which disadvantageously causes decrease in handling performance (handling stability) and wet grip performance of automobile and causes decrease in abrasion resistance of tires.

Patent Document 1 discloses a rubber composition for tires which contains both anhydrous silica and hydrous silica in order to improve wet skid resistance. However, there remains a problem that low heat build-up property cannot be sufficiently improved.

Patent Document 2 discloses a modified diene rubber composition inclusive of silica and a diene rubber modified with an organosilicon compound, and excellent in rolling resistance performance (fuel economy performance), grip property, and abrasion resistance. Patent Document 3 discloses a rubber composition inclusive of a tin-modified polybutadiene rubber and excellent in cut resistance, fuel economy, and the like. However, the rubber compositions can be further improved to achieve both lower heat build-up property and better wet grip performance.

Patent Document 1: JP-A 2003-192842
Patent Document 2: JP-A 2000-344955
Patent Document 3: JP-A 2006-063143

SUMMARY OF THE INVENTION

The present invention has its object to provide a rubber composition that solves the above-mentioned problems and can be used for a tread to supply a tire having both low heat build-up property and good wet grip performance.

The present invention relates to a rubber composition including:
silica and
a rubber component that contains a modified butadiene rubber having a vinyl content of 35% by weight or less and having, in a main chain thereof, a constitutional unit derived from a nitrogen-containing compound represented by the formula:

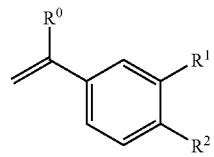

wherein $R^1$ and $R^2$ are each hydrogen, the formula:

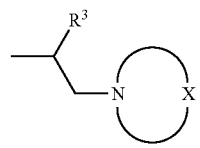

or the formula:

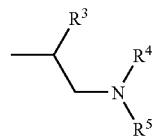

provided that at least one of $R^1$ and $R^2$ is not hydrogen, $R^3$ represents hydrogen or a $C_{1-4}$ hydrocarbon group, X represents a saturated ring-forming part consisting of $(CR^8R^9)_l$, $(CR^{10}R^{11})_m$—$NR^{12}$—$(CR^{13}R^{14})_n$, $(CR^{10}R^{11})_m$—O—$(CR^{13}R^{14})_n$, or $(CR^{10}R^{11})_m$—S—$(CR^{13}R^{14})_n$,
X May be Substituted with the Formula:

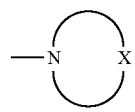

or the formula:

Z represents a saturated ring-forming part consisting of $(CR^8R^9)_l$, $(CR^{10}R^{11})_m$—$NR^{12}$—$(CR^{13}R^{14})_n$, $(CR^{10}R^{11})_m$—O—$(CR^{13}R^{14})_n$, or $(CR^{10}R^{11})_m$—S—$(CR^{13}R^{14})_n$,
$R^4$ to $R^7$ each represent hydrogen, a $C_{1-30}$ aliphatic hydrocarbon group, a $C_{3-30}$ alicyclic hydrocarbon group, a $C_{5-30}$ aromatic hydrocarbon group, or a heterocyclic group containing 3 to 30 annular atoms, and are the same as or different from each other, $R^0$, and $R^8$ to $R^{14}$ each represent hydrogen, a $C_{1-30}$ aliphatic hydrocarbon group, a $C_{3-30}$ alicyclic hydrocarbon group, or a $C_{5-30}$ aromatic hydrocarbon group, and are the same as or different from each other, and
l represents an integer of 3 to 10, and m and n each represent an integer of 1 to 9,
wherein an amount of the modified butadiene rubber is 5 to 45% by weight per 100% by weight of the rubber component, and
wherein an amount of the silica is 10 to 150 parts by weight per 100 parts by weight of the rubber component.

The modified butadiene rubber preferably has at least one terminal further modified with a modifying agent having a functional group that contains at least one atom selected from the group consisting of nitrogen, oxygen and silicon.

The present invention also relates to a tire having a tread prepared using the above-mentioned rubber composition.

The rubber composition of the present invention contains: silica and a modified butadiene rubber having a specific vinyl content and including a specific nitrogen-containing compound as a monomer unit, each in a predetermined amount. Thus, it is possible to provide a tire having both low heat build-up property and good wet grip performance by using the rubber composition for a tread.

BEST MODE FOR CARRYING OUT THE INVENTION

The rubber composition of the present invention includes:
a predetermined amount of silica, and
a rubber component that contains a predetermined amount of a modified butadiene rubber (a modified BR) having a vinyl content of 35% by weight or less and having, in a main chain thereof, a constitutional unit derived from a nitrogen-containing compound represented by the formula:

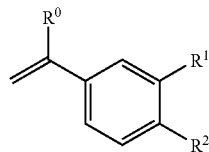

wherein $R^1$ and $R^2$ are each hydrogen, the formula:

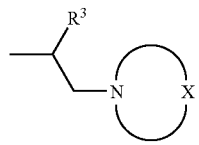

or the formula:

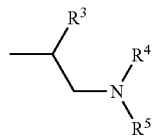

provided that at least one of $R^1$ and $R^2$ is not hydrogen,
$R^3$ represents hydrogen or a $C_1$-$C_4$ hydrocarbon group,
X represents a saturated ring-forming part consisting of $(CR^8R^9)_l$, $(CR^{10}R^{11})_m$—$NR^{12}$—$(CR^{13}R^{14})_n$, $(CR^{10}R^{11})_m$—O—$(CR^{13}R^{14})_n$, or $(CR^{10}R^{11})_m$—S—$(CR^{13}R^{14})_n$,
X may be substituted with the formula:

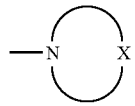

or the formula:

Z represents a saturated ring-forming part consisting of $(CR^8R^9)_l$, $(CR^{10}R^{11})_m$—$NR^{12}$—$(CR^{13}R^{14})_n$, $(CR^{10}R^{11})_m$—O—$(CR^{13}R^{14})_n$, or $(CR^{10}R^{11})_m$—S—$(CR^{13}R^{14})_n$,
$R^4$ to $R^7$ each represent hydrogen, a $C_{1-30}$ aliphatic hydrocarbon group, a $C_{3-30}$ alicyclic hydrocarbon group, a $C_{5-30}$ aromatic hydrocarbon group, or a heterocyclic group containing 3 to 30 annular atoms, and are the same as or different from each other, $R^0$, and $R^8$ to $R^{14}$ each represent hydrogen, a $C_{1-30}$ aliphatic hydrocarbon group, a $C_{3-30}$ alicyclic hydrocarbon group, or a $C_{5-30}$ aromatic hydrocarbon group, and are the same as or different from each other, and
l represents an integer of 3 to 10, and m and n each represent an integer of 1 to 9.

When $R^0$, and $R^8$ to $R^{14}$ are each an aliphatic hydrocarbon group, the number of carbon atoms is 1 to 30, and preferably 1 to 5. When $R^0$, and $R^8$ to $R^{14}$ are each an alicyclic hydrocarbon group, the number of carbon atoms is 3 to 30, and preferably 3 to 10. When $R^0$, and $R^8$ to $R^{14}$ are each an aromatic hydrocarbon group, the number of carbon atoms is 5 to 30, and preferably 5 to 10.

Preferably, $R^0$, and $R^8$ to $R^{14}$ are each hydrogen or a $C_{1-2}$ aliphatic hydrocarbon group.

$R^3$ is preferably hydrogen or a $C_{1-2}$ hydrocarbon group.

When $R^4$ to $R^7$ are each an aliphatic hydrocarbon group, the number of carbon atoms is 1 to 30, and preferably 1 to 10. When $R^4$ to $R^7$ are each an alicyclic hydrocarbon group, the number of carbon atoms is 3 to 30, and preferably 3 to 10. When $R^4$ to $R^7$ are each an aromatic hydrocarbon group, the number of carbon atoms is 5 to 30, and preferably 5 to 10. When $R^4$ to $R^7$ are each a heterocyclic group (including an aromatic heterocyclic group), the number of annular atoms is 3 to 30, and preferably 3 to 10.

Preferably, $R^4$ to $R^7$ are each an aliphatic hydrocarbon group, an aromatic hydrocarbon group, or a heterocyclic group, and more preferably an aliphatic hydrocarbon group.

The symbol l is an integer of 3 to 10, and preferably an integer of 3 to 7. The symbols m and n are each an integer of 1 to 9, and preferably an integer of 1 to 6.

Since the symbol l is an integer of 3 to 10, there is a plurality of $(CR^8R^9)$. The $(CR^8R^9)$ moieties are the same as or different from each other. Similarly, the $(CR^{10}R^{11})$ moieties are the same as or different from each other when the symbol m is an integer of two or more. The $(CR^{13}R^{14})$ moieties are the same as or different from each other when the symbol n is an integer of two or more.

The "saturated ring-forming part" used herein means a part of a saturated ring group. Specifically, in the above formulas, X and N constitute a saturated ring group, and Z and N constitute a saturated ring group.

The modified BR is a copolymer obtainable by copolymerizing butadiene (1,3-butadiene), and a nitrogen-containing compound (monomer) represented by the above formula, and contains a constitutional unit derived from the nitrogen-containing compound in a main chain portion thereof. The term "main chain portion" used herein includes a terminal portion of polymer.

Unless interfering with the present invention, the modified BR may be one in which, in addition to the butadiene and the nitrogen-containing compound, other conjugated diene compounds and/or aromatic vinyl compounds are used as monomers. Examples of the other conjugated diene compounds include isoprene, 1,3-pentadiene, 2,3-dimethylbutadiene, 2-phenyl-1,3-butadiene, 1,3-hexadiene, and the like. These may be used singly, or two or more of these may be used in combination. Preferred among these is isoprene from the viewpoints of practical utilities such as easy availability of monomers.

Examples of the aromatic vinyl compounds include styrene, α-methylstyrene, 1-vinylnaphthalene, 3-vinyltoluene, ethylvinylbenzene, divinylbenzene, 4-cyclohexylstyrene, 2,4,6-trimethylstyrene, and the like. These may be used singly, or two or more of these may be used in combination.

Examples of the nitrogen-containing compound represented by the above-mentioned formula include: 3- or 4-(2-azetidinoethyl)styrene, 3- or
4-(2-pyrrolidinoethyl)styrene, 3- or
4-(2-piperidinoethyl)styrene, 3- or
4-(2-hexamethyleneiminoethyl)styrene, 3- or
4-(2-heptamethyleneiminoethyl)styrene, 3- or
4-(2-octamethyleneiminoethyl)styrene, 3- or
4-(2-(2,5-dimethylpyrrolidino)ethyl)styrene, 3- or
4-(2-(2-methylpiperidino)ethyl)styrene, 3- or
4-(2-(3-methylpiperidino)ethyl)styrene, 3- or
4-(2-(4-methylpiperidino)ethyl)styrene, 3- or
4-(2-(2-ethylpiperidino)ethyl)styrene, 3- or
4-(2-(4-(1-pyrrolidinyl)piperidino)ethyl)styrene, 3- or
4-(2-(4-piperidinopiperidino)ethyl)styrene, 3- or
4-(2-(2,6-dimethylpiperidino)ethyl)styrene, 3- or
4-(2-(3,3-dimethylpiperidino)ethyl)styrene, 3- or
4-(2-(3,5-dimethylpiperidino)ethyl)styrene, 3- or
4-(2-(2,2,6,6-tetramethylpiperidino)ethyl)styrene, 3- or
4-(2-(4-dimethylamino-2,2,6,6-tetramethylpiperidino)ethyl)styrene, 3- or 4-(2-(1-methylpiperazino)ethyl)styrene, 3- or
4-(2-(1-ethylpiperazino)ethyl)styrene, 3- or
4-(2-(1-methylhomopiperazino)ethyl)styrene, 3- or
4-(2-morpholinoethyl)styrene, 3- or
4-(2-(2,6-dimethylmorpholino)ethyl)styrene, 3- or
4-(2-thiazolidinoethyl)styrene, 3- or
4-(2-thiomorpholinoethyl)styrene, 3- or
4-(2-dimethylaminoethyl)styrene, 3- or
4-(2-(N-ethylmethylamino)ethyl)styrene, 3- or
4-(2-diethylaminoethyl)styrene, 3- or
4-(2-(N-methylpropylamino)ethyl)styrene, 3- or
4-(2-(N-methylisopropylamino)ethyl)styrene, 3- or
4-(2-(N-ethylisopropylamino)ethyl)styrene, 3- or
4-(2-dipropylaminoethyl)styrene, 3- or
4-(2-diisopropylaminoethyl)styrene, 3- or
4-(2-(N-methylbutylamino)ethyl)styrene, 3- or
4-(2-(N-ethylbutylamino)ethyl)styrene, 3- or
4-(2-(N-methyl-tert-butylamino)ethyl)styrene, 3- or
4-(2-(N-tert-butylisopropylamino)ethyl)styrene, 3- or
4-(2-dibutylaminoethyl)styrene, 3- or
4-(2-(di-sec-butyl)aminoethyl)styrene, 3- or
4-(2-diisobutylaminoethyl)styrene, 3- or
4-(2-(tert-amyl-tert-butylamino)ethyl)styrene, 3- or
4-(2-dipentylaminoethyl)styrene, 3- or
4-(2-(N-methylhexylamino)ethyl)styrene, 3- or
4-(2-dihexylaminoethyl)styrene, 3- or
4-(2-(tert-amyl-tert-octylamino)ethyl)styrene, 3- or
4-(2-dioctylaminoethyl)styrene, 3- or
4-(2-bis(2-ethylhexylamino)ethyl)styrene, 3- or
4-(2-didecylaminoethyl)styrene, 3- or
4-(2-(N-methyloctadecylamino)ethyl)styrene, 3- or
4-(2-(N-methylanilino)ethyl)styrene, 3- or
4-(2-diphenylaminoethyl)styrene, 3- or
4-(2-(N-phenylbenzylamino)ethyl)styrene, 3- or
4-(2-(N-phenyl-1-naphthylamino)ethyl)styrene, 3- or
4-(2-(N-phenyl-2-naphthylamino)ethyl)styrene, 3- or
4-(2-(N-benzylmethylamino)ethyl)styrene, 3- or
4-(2-(N-ethylbenzylamino)ethyl)styrene, 3- or
4-(2-(N-isopropylbenzylamino)ethyl)styrene, 3- or
4-(2-(N-butylbenzylamino)ethyl)styrene, 3- or
4-(2-(N-(tert-butyl)benzylamino)ethyl)styrene, 3- or
4-(2-dibenzylaminoethyl)styrene, 3- or
4-(2-(N-methylphenethylamino)ethyl)styrene, 3- or
4-(2-(N-benzyl-2-phenethylamino)ethyl)styrene, 3- or
4-(2-(4-benzylpiperidino)ethyl)styrene, 3- or
4-(2-(1-phenylpiperazino)ethyl)styrene, 3- or
4-(2-(1-benzylpiperazino)ethyl)styrene, 3- or
4-(2-indolinoethyl)styrene, 3- or
4-(2-(2-methylindolino)ethyl)styrene, 3- or
4-(2-(1,2,3,4-tetrahydroquinolino)ethyl)styrene, 3- or
4-(2-(1,2,3,4-tetrahydroisoquinolino)ethyl)styrene, 3- or
4-(2-phenoxazinoethyl)styrene, 3- or
4-(2-phenothiazinoethyl)styrene, 3- or
4-(2-anilinopyridinoethyl)styrene, 3- or
4-(2-(2-benzylaminopyridino)ethyl)styrene, 3- or
4-(2-(2,2'-dipyridylamino)ethyl)styrene, 3- or
4-(2-(2-methylamino)pyridinoethyl)styrene, 3- or
4-(2-(1-(2-pyridyl)piperazino)ethyl)styrene, 3- or
4-(2-(2-methylaminomethyl)pyridino)ethyl)styrene, 3- or
4-(2-(4-(ethylaminomethyl)pyridino)ethyl)styrene, 3- or
4-(2-(4-(ethylaminomethyl)pyridino)ethyl)styrene, and the like. These may be used singly, or two or more of these may be used in combination.

The modified BR to be used in the present invention can be produced by copolymerizing the nitrogen-containing compound, butadiene, and if necessary, other conjugated diene compounds and/or aromatic vinyl compounds. The polymerization is not particularly limited, and anyone of solution polymerization, gas phase polymerization, and bulk polymerization can be used. The solution polymerization is particularly preferable in terms of the design flexibility of polymers, processability, and the like. The polymerization may be performed by either a batch system or a continuous system. According to the solution polymerization, the desired modified BR can be produced by, for example, anionically polymerizing the nitrogen-containing compound with butadiene, and if necessary, other conjugated diene compounds and/or aromatic vinyl compounds with use of a lithium compound as a polymerization initiator.

Upon using the solution polymerization, the monomer concentration in solution is preferably 5% by mass or more, and more preferably 10% by mass or more. When the monomer concentration in solution is less than 5% by mass, the amount of polymer obtained tends to become small, likely leading to cost increase. The monomer concentration in solution is preferably 50% by mass or less, and more preferably 30% by mass or less. When the monomer concentration in solution exceeds 50% by mass, the solution viscosity is so high that stirring may be difficult, resulting in a tendency toward difficulty in polymerization.

In the case of anionic polymerization, the polymerization initiator is not particularly limited, and organolithium compounds are preferably used. The organolithium compounds preferably have a $C_{2-20}$ alkyl group. Examples thereof include ethyllithium, n-propyllithium, isopropyllithium, n-butyllithium, sec-butyllithium, tert-butyllithium, tert-octyllithium, n-decyllithium, phenyllithium, 2-naphthyllithium, 2-butyl-phenyllithium, 4-phenyl-butyllithium, cyclohexyllithium, cyclopentyllithium, a reaction product of diisopropenylbenzene and butyllithium, and the like. Preferred among these are n-butyllithium and sec-butyllithium from the viewpoints of easy availability, safety, and the like.

The method for producing a polymer by anionic polymerization using the organolithium compound as a polymerization initiator is not particularly limited, and conventionally known methods can be used.

Specifically, the desired modified BR can be obtained by anionically polymerizing the nitrogen-containing compound represented by the above formula with butadiene, and if necessary, other conjugated diene compounds and/or aromatic vinyl compounds in an organic solvent inert to the reaction, for example, a hydrocarbon solvent such as an aliphatic, alicyclic, or aromatic hydrocarbon compound, with use of the above lithium compound as a polymerization initiator, and if necessary, in the presence of a randomizer.

$C_{3-8}$ hydrocarbon solvents are preferable as the hydrocarbon solvent. Examples thereof include: propane, n-butane, isobutane, n-pentane, isopentane, n-hexane, cyclohexane, propene, 1-butene, isobutene, trans-2-butene, cis-2-butene, 1-pentene, 2-pentene, 1-hexene, 2-hexene, benzene, toluene, xylene, ethylbenzene, and the like. These may be used singly, or two or more of these may be used in admixture.

The term "randomizer" used herein means a compound having a function of controlling the microstructure of conjugated diene portion in a polymer, for example, increase of 1,2-bond in butadiene portion, or increase of 3,4-bond in isoprene portion, or a function of controlling the compositional distribution of each monomer units in a polymer, for example, randomization of butadiene unit and styrene unit in a butadiene-styrene copolymer. The randomizer is not particularly limited, and any of publicly known compounds that are generally used as a randomizer can be used. Examples thereof include ethers and tertiary amines, such as dimethoxybenzene, tetrahydrofuran, dimethoxyethane, diethylene glycol dibutyl ether, diethylene glycol dimethyl ether, bistetrahydrofuryl propane, triethylamine, pyridine, N-methylmorpholine, N,N,N',N'-tetramethylethylenediamine, and 1,2-dipiperidinoethane. Potassium salts, such as potassium-t-amylate, and potassium-t-butoxide, and sodium salts, such as sodium-t-amylate, can be also used. These randomizers may be used singly, or two or more of these may be used in combination. The randomizer is preferably used in an amount of 0.01 molar equivalents or more, and more preferably 0.05 molar equivalents or more, per mole of the organolithium compound. When the randomizer is used in an amount of less than 0.01 molar equivalents, effects of adding it tend to become small, likely resulting in difficulty in randomization. The randomizer is preferably used in an amount of 1000 molar equivalents or less, and more preferably 500 molar equivalents or less, per mole of the organolithium compound. When the randomizer is used in an amount of more than 1000 molar equivalents, the reaction rate of monomers tends to greatly change, likely resulting in difficulty in randomization on the contrary.

The modified BR is preferably a copolymer in which at least one terminal thereof is modified with a modifying agent having a functional group that contains at least one atom selected from the group consisting of nitrogen, oxygen and silicon. Examples of the functional group containing at least one atom selected from the group consisting of nitrogen, oxygen and silicon include: an amino group, an amide group, an alkoxysilyl group, an isocyanato group, an imino group, an imidazole group, an urea group, an ether group, a carbonyl group, a carboxyl group, a hydroxyl group, a nitrile group, a pyridyl group, and the like. Examples of the modifying agent include:
3-glycidoxypropyltrimethoxysilane,
(3-triethoxysilylpropyl)tetrasulfide,
1-(4-N, N-dimethylaminophenyl)-1-phenylethylene,
1,1-dimethoxytrimethylamine, 1,2-bis(trichlorosilyl) ethane,
1,3,5-tris(3-triethoxysilylpropyl) isocyanurate,
1,3,5-tris(3-trimethoxysilylpropyl) isocyanurate,
1,3-dimethyl-2-imidazolidinone, 1,3-propanediamine,
1,4-diaminobutane,
1-[3-(triethoxysilyl)propyl]-4,5-dihydroimidazole,
1-glycidyl-4-(2-pyridyl)piperazine,
1-glycidyl-4-phenylpiperazine,
1-glycidyl-4-methylpiperazine,
1-glycidyl-4-methylhomopiperazine,
1-glycidylhexamethyleneimine,
11-aminoundecyltriethoxysilane,
11-aminoundecyltrimethoxysilane,
1-benzyl-4-glycidylpiperazine,
2-(3,4-epoxycyclohexyl)ethyltrimethoxysilane,
2-(4-morpholinodithio)benzothiazole,
2-(6-aminoethyl)-3-aminopropyltrimethoxysilane,
2-(triethoxysilylethyl)pyridine,
2-(trimethoxysilylethyl)pyridine,
2-(2-pyridylethyl)thiopropyltrimethoxysilane,
2-(4-pyridylethyl)thiopropyltrimethoxysilane,
2,2-diethoxy-1,6-diaza-2-silacyclooctane,
2,2-dimethoxy-1,6-diaza-2-silacyclooctane,
2,3-dichloro-1,4-naphthoquinone, 2,4-dinitrobenzenesulfonyl chloride, 2,4-tolylene diisocyanate,
2-(4-pyridylethyl)triethoxysilane,
2-(4-pyridylethyl)trimethoxysilane,
2-cyanoethyltriethoxysilane,
2-tributylstannyl-1,3-butadiene,
2-(trimethoxysilylethyl)pyridine, 2-vinylpyridine,
2-(4-pyridylethyl)triethoxysilane,
2-(4-pyridylethyl)trimethoxysilane, 2-laurylthioethyl phenyl ketone,
3-(1-hexamethyleneimino)propyl(triethoxy)silane,
3-(1,3-dimethylbutylidene)aminopropyltriethoxysilane,
3-(1,3-dimethylbutylidene)aminopropyltrimethoxysilane,
3-(2-aminoethylaminopropyl)trimethoxysilane,
3-(m-aminophenoxy)propyltrimethoxysilane,
3-(N,N-dimethylamino)propyltriethoxysilane,
3-(N,N-dimethylamino)propyltrimethoxysilane,
3-(N-methylamino)propyltriethoxysilane,
3-(N-methylamino)propyltrimethoxysilane,
3-(N-allylamino)propyltrimethoxysilane, 3,4-diaminobenzoic acid, 3-aminopropyldimethylethoxysilane,
3-aminopropyltriethoxysilane, 3-aminopropyltrimethoxysilane,
3-aminopropyl tris(methoxydiethoxy)silane,
3-aminopropyldiisopropylethoxysilane,
3-isocyanatepropyltriethoxysilane,
3-glycidoxypropyltriethoxysilane,
3-glycidoxypropyltrimethoxysilane,
3-glycidoxypropylmethyldimethoxysilane,
3-diethylaminopropyltrimethoxysilane,
3-diethoxy(methyl)silylpropyl succinic anhydride,
3-(N,N-diethylaminopropyl)triethoxysilane,
3-(N,N-diethylaminopropyl)trimethoxysilane,
3-(N,N-dimethylaminopropyl)diethoxymethylsilane,
3-(N,N-dimethylaminopropyl)triethoxysilane,
3-(N,N-dimethylaminopropyl)trimethoxysilane,
3-triethoxysilylpropyl succinic anhydride,
3-triethoxysilylpropyl acetic anhydride,
3-triphenoxysilylpropyl succinic anhydride,
3-triphenoxysilylpropyl acetic anhydride,
3-trimethoxysilylpropyl benzothiazole tetrasulfide,
3-hexamethyleneiminopropyltriethoxysilane, 3-mercaptopropyltrimethoxysilane,
(3-triethoxysilylpropyl)diethylenetriamine,
(3-trimethoxysilylpropyl)diethylenetriamine,
4,4'-bis(diethylamino)benzophenone,
4,4'-bis(dimethylamino)benzophenone,
4'-(imidazol-1-yl)-acetophenone,
4-[3-(N,N-diglycidylamino)propyl]morpholine,
4-glycidyl-2,2,6,6-tetramethylpiperidinyloxy,
4-aminobutyltriethoxysilane, 4-vinylpyridine,
4-morpholinoacetophenone, 4-morpholinobenzophenone,
m-aminophenyltrimethoxysilane,
N-(1,3-dimethylbutylidene)-3-(triethoxysilyl)-1-propaneamine,
N-(1,3-dimethylbutylidene)-3-(trimethoxysilyl)-1-propaneamine,
N-(1-methylethylidene)-3-(triethoxysilyl)-1-propaneamine,
N-(2-aminoethyl)-3-aminopropylmethyldiethoxysilane,
N-(2-aminoethyl)-3-aminopropylmethyldimethoxysilane,
N-(2-aminoethyl)-3-aminopropyltriethoxysilane,
N-(2-aminoethyl)-3-aminopropyltrimethoxysilane,
N-(2-aminoethyl)-11-aminoundecyltriethoxysilane,
N-(2-aminoethyl)-11-aminoundecyltrimethoxysilane,
N-(2-aminoethyl)-3-aminoisobutylmethyldiethoxysilane,
N-(2-aminoethyl)-3-aminoisobutylmethyldimethoxysilane,
N-(3-diethoxymethylsilylpropyl)succinimide,
N-(3-triethoxysilylpropyl)-4,5-dihydroimidazole,
N-(3-triethoxysilylpropyl)pyrrole,
N-(3-trimethoxysilylpropyl)pyrrole,
N-3-[amino(polypropyleneoxy)]aminopropyltrimethoxysilane,
N-[5-(triethoxysilyl)-2-aza-1-oxopentyl]caprolactam,
N-[5-(trimethoxysilyl)-2-aza-1-oxopentyl]caprolactam,
N-(6-aminohexyl)aminomethyltriethoxysilane,
N-(6-aminohexyl)aminomethyltrimethoxysilane,
N-allyl-aza-2,2-diethoxysilacyclopentane,
N-allyl-aza-2,2-dimethoxysilacyclopentane,
N-(cyclohexylthio)phthalimide,
N-n-butyl-aza-2,2-diethoxysilacyclopentane,
N-n-butyl-aza-2,2-dimethoxysilacyclopentane,
N,N,N',N'-tetraethylaminobenzophenone,
N,N,N',N'-tetramethylthiourea, N,N,N',N'-tetramethylurea,
N,N'-ethyleneurea, N,N'-diethylaminobenzophenone,
N,N'-diethylaminobenzophenone, N,N'-diethylaminobenzofuran,
methyl N,N'-diethylcarbamate, N,N'-diethylurea,
(N,N-diethyl-3-aminopropyl)triethoxysilane, (N,N-diethyl-3-aminopropyl)trimethoxysilane, N,N-dioctyl-N'-triethoxysilylpropylurea,
N,N-dioctyl-N'-trimethoxysilylpropylurea, methyl
N,N-diethylcarbamate, N,N-diglycidylcyclohexylamine,
N,N-dimethyl-o-toluidine, N,N-dimethylaminostyrene,
N,N-diethylaminopropylacrylamide,
N,N-dimethylaminopropylacrylamide,
N-ethylaminoisobutyltriethoxysilane,
N-ethylaminoisobutyltrimethoxysilane,
N-ethylaminoisobutylmethyldiethoxysilane,
N-oxydiethylene-2-benzothiazole sulfenamide,
N-cyclohexylaminopropyltriethoxysilane,
N-cyclohexylaminopropyltrimethoxysilane,
N-methylaminopropylmethyldimethoxysilane,
N-methylaminopropylmethyldiethoxysilane, N-vinylbenzyl
azacycloheptane, N-phenylpyrrolidone,
N-phenylaminopropyltriethoxysilane,
N-phenylaminopropyltrimethoxysilane,
N-phenylaminomethyltriethoxysilane,
N-phenylaminomethyltrimethoxysilane,
n-butylaminopropyltriethoxysilane,
n-butylaminopropyltrimethoxysilane,
N-methylaminopropyltriethoxysilane,
N-methylaminopropyltrimethoxysilane, N-methyl-2-piperidone,
N-methyl-2-pyrrolidone, N-methyl-ε-caprolactam,
N-methylindolinone, N-methylpyrrolidone,
p-(2-dimethylaminoethyl)styrene,
p-aminophenyltrimethoxysilane,
γ-glycidoxypropyltrimethoxysilane,
γ-methacryloxypropyltrimethoxysilane,
(aminoethylamino)-3-isobutyldiethoxysilane,
(aminoethylamino)-3-isobutyldimethoxysilane,
(aminoethylaminomethyl)phenethyltriethoxysilane,
(aminoethylaminomethyl)phenethyltrimethoxysilane,
acrylic
acid, diethyl adipate, acetamidopropyltrimethoxysilane,
aminophenyltrimethoxysilane, aminobenzophenone,
ureidopropyltriethoxysilane, ureidopropyltrimethoxysilane,
ethylene oxide,
octadecyldimethyl(3-trimethoxysilylpropyl)ammonium chloride,
glycidoxypropyltriethoxysilane,
glycidoxypropyltrimethoxysilane, glycerol tristearate,
chlorotriethoxysilane, chloropropyltriethoxysilane,
chloropolydimethylsiloxane, chloromethyldiphenoxysilane,
diallyldiphenyltin, diethylaminomethyltriethoxysilane,
diethylaminomethyltrimethoxysilane, diethyl(glycidyl) amine,
diethyldithiocarbamic acid 2-benzothiazolyl ester,
diethoxydichlorosilane,
(cyclohexylaminomethyl)triethoxysilane,
(cyclohexylaminomethyl)trimethoxysilane, diglycidyl
polysiloxane, dichlorodiphenoxysilane,
dicyclohexylcarbodiimide, divinylbenzene,
diphenylcarbodiimide, diphenylcyanamide, diphenylmethane
diisocyanate, diphenoxymethylchlorosilane,
dibutyldichlorotin,
dimethyl(acetoxy-methylsiloxane)polydimethylsiloxane,
dimethylaminomethyltriethoxysilane,
dimethylaminomethyltrimethoxysilane,
dimethyl(methoxy-methylsiloxane)polydimethylsiloxane,
dimethylimidazolidinone, dimethylethyleneurea,
dimethyldichlorosilane, dimethylsulfomoyl chloride,
silsesquioxane, sorbitan trioleate, sorbitan monolaurate,
titanium tetrakis(2-ethylhexyoxide), tetraethoxysilane,
tetraglycidyl-1,3-bisaminomethylcyclohexane,
tetraphenoxysilane, tetramethylthiuram disulfide,
tetramethoxysilane, triethoxyvinylsilane,
tris(3-trimethoxysilylpropyl)cyanurate, triphenylphosphate,
triphenoxychlorosilane, triphenoxymethylsilicon,
triphenoxymethylsilane, carbon dioxide,
bis(triethoxysilylpropyl)amine, bis(trimethoxysilylpropyl)
amine, bis[3-(triethoxysilyl)propyl]ethylenediamine,
bis[3-(trimethoxysilyl)propyl]ethylenediamine,
bis[3-(triethoxysilyl)propyl]urea,
bis[(trimethoxysilyl)propyl]urea,
bis(2-hydroxymethyl)-3-aminopropyltriethoxysilane,
bis(2-hydroxymethyl)-3-aminopropyltrimethoxysilane,
bis(2-ethylhexanoate)tin,
bis(2-methylbutoxy)methylchlorosilane,
bis(3-triethoxysilylpropyl)tetrasulfide,
bisdiethylaminobenzophenone, bisphenol A diglycidyl ether,
bisphenoxyethanol fluorene diglycidyl ether,
bis(methyldiethoxysilylpropyl)amine,
bis(methyldimethoxysilylpropyl)-N-methylamine,
hydroxymethyltriethoxysilane, vinyltris(2-ethylhexyloxy)silane, vinylbenzyldiethylamine, vinylbenzyldimethylamine, vinylbenzyltributyltin, vinylbenzylpiperidine, vinylbenzylpyrrolidine, pyrrolidine, phenyl isocyanate, phenyl isothiocyanate, (phenylaminomethyl)methyldimethoxysilane, (phenylaminomethyl)methyldiethoxysilane, phthalic acid amide,
hexamethylene diisocyanate, benzylideneaniline, polydiphenylmethane diisocyanate, polydimethylsiloxane, methyl-4-pyridyl ketone, methylcaprolactam, methyltriethoxysilane, methyltriphenoxysilane, methyl laurylthiopropionate, silicon tetrachloride, and the like. In terms of performance improvement, preferred among these are
3-(N,N-dimethylamino)propyltrimethoxysilane,
3-(N,N-diethylaminopropyl)trimethoxysilane,
3-(N,N-dimethylamino)propyltriethoxysilane,
3-(N,N-diethylaminopropyl)triethoxysilane,
3-glycidoxypropyltrimethoxysilane,
2-(4-pyridylethyl)triethoxysilane,
N-(3-triethoxysilylpropyl)-4,5-dihydroimidazole, silicon tetrachloride, and the like.

Modification of the modified BR at its terminal(s) with the modifying agent can be performed by reacting 0.01 to 10 parts by weight of the modifying agent with 100 parts by weight of the modified BR so as to, for example in the case of the modified BR obtained by anionic polymerization, react a functional group of the modifying agent with a terminal anion in the modified BR. At least one terminal of the modified BR is preferably modified, and both terminals thereof are more preferably modified.

In the present invention, at the end of this reaction, publicly known antioxidants, and/or alcohols and the like for stopping polymerization reaction, may be added if necessary.

The vinyl content of the modified BR is 35% by weight or less, preferably 30% by weight or less, and more preferably 25% by weight or less. When the vinyl content thereof exceeds 35% by weight, low heat build-up property tends to be poor. The vinyl content thereof is preferably 5% by weight or more, more preferably 10% by weight or more, and further preferably 15% by weight or more.

It is to be noted that the vinyl content used herein refers to the vinyl content in butadiene portion and is measured by $H^1$-NMR.

The amount of the nitrogen-containing compound in the modified BR is preferably 0.05 to 30% by weight. More preferably, the lower limit thereof is 0.1% by weight, and the upper limit thereof is 20% by weight. When the amount of the nitrogen-containing compound is less than 0.05% by weight, fuel economy and wet grip performance tend not to be improved. The amount exceeding 30% by weight tends to increase cost.

The weight-average molecular weight (Mw) of the modified BR is preferably $1.0\times10^5$ to $2.0\times10^6$. More preferably, the lower limit thereof is $2.0\times10^5$, and the upper limit thereof is $1.5\times10^6$. When the weight-average molecular weight is less than $1.0\times10^5$, hysteresis loss may be so large that fuel consumption is not sufficiently reduced; also, abrasion resistance tends to be lowered. When it exceeds $2.0\times10^6$, processability tends to decrease.

In the present invention, in addition to the modified BR, diene rubbers are preferably used as the rubber component of the rubber composition. The diene rubbers comprise natural rubbers and/or diene type synthetic rubbers, and examples of the diene type synthetic rubbers include: isoprene rubber (IR), butadiene rubber (BR), styrene-butadiene rubber (SBR), acrylonitrile-butadiene rubber (NBR), chloroprene rubber (CR), isobutylene-isoprene rubber (IIR), and the like. NR, BR and SBR are preferred among these because of their favorable balance between grip performance and abrasion resistance. These rubbers may be used singly, or two or more of these may be used in combination.

The amount of the modified BR is 5% by weight or more, preferably 10% by weight or more, more preferably 15% by weight or more, and further preferably 20% by weight or more, per 100% by weight of the rubber component. When the amount thereof is less than 5% by weight, low heat build-up property tends to be poor. The amount of the modified BR is 45% by weight or less, preferably 40% by weight or less, more preferably 35% by weight or less, and further preferably 30% by weight or less, per 100% by weight of the rubber component. The amount exceeding 45% by weight tends to deteriorate grip performance.

Silica is blended as a reinforcing agent in the rubber composition of the present invention. The silica is not particularly limited, and examples thereof include dry silica (silicic anhydride), wet silica (hydrous silicic acid), and the like. The wet silica is preferable because it has more silanol groups. The silica may be used singly, or two or more kinds thereof may be used in combination.

The nitrogen adsorption specific surface area ($N_2SA$) of silica is preferably 50 $m^2/g$ or more, and particularly preferably 80 $m^2/g$ or more. A silica having a nitrogen adsorption specific surface area of less than 50 $m^2/g$ tends to be inferior in breaking strength. The $N_2SA$ of silica is preferably 300 $m^2/g$ or less, and particularly preferably 250 $m^2/g$ or less. A silica having an $N_2SA$ exceeding 300 $m^2/g$ tends to exhibit poor dispersibility.

The amount of silica is 10 parts by weight or more, and preferably 20 parts by weight or more, per 100 parts by weight of the rubber component. When the amount of silica is less than 10 parts by weight, effects of blending silica cannot be sufficiently exerted. The amount of silica is 150 parts by weight or less, and preferably 120 parts by weight or less. The amount of silica exceeding 150 parts by weight makes it difficult to disperse silica in the rubber component, resulting in poor rubber processability.

The rubber composition of the present invention preferably contains a silane coupling agent in combination with silica.

Any silane coupling agent conventionally used in combination with silica can be used as a silane coupling agent suitably used in the present invention. Examples thereof include: sulfide-type silane coupling agents such as
bis(3-triethoxysilylpropyl)tetrasulfide,
bis(2-triethoxysilylethyl)tetrasulfide,
bis(4-triethoxysilylbutyl)tetrasulfide,
bis(3-trimethoxysilylpropyl)tetrasulfide,
bis(2-trimethoxysilylethyl)tetrasulfide,
bis(4-trimethoxysilylbutyl)tetrasulfide,
bis(3-triethoxysilylpropyl)trisulfide,
bis(2-triethoxysilylethyl)trisulfide,
bis(4-triethoxysilylbutyl)trisulfide,
bis(3-trimethoxysilylpropyl)trisulfide,
bis(2-trimethoxysilylethyl)trisulfide,
bis(4-trimethoxysilylbutyl)trisulfide,
bis(3-triethoxysilylpropyl)disulfide,
bis(2-triethoxysilylethyl)disulfide,
bis(4-triethoxysilylbutyl)disulfide,
bis(3-trimethoxysilylpropyl)disulfide,
bis(2-trimethoxysilylethyl)disulfide,
bis(4-trimethoxysilylbutyl)disulfide,
3-trimethoxysilylpropyl-N,N-dimethylthiocarbamoyl tetrasulfide,
3-triethoxysilylpropyl-N,N-dimethylthiocarbamoyl tetrasulfide, 2-triethoxysilylethyl-N,N-dimethylthiocarbamoyl tetrasulfide, 2-trimethoxysilylethyl-N,N-dimethylthiocarbamoyl tetrasulfide, 3-trimethoxysilylpropylbenzothiazolyl tetrasulfide, 3-triethoxysilylpropylbenzothiazole tetrasulfide, 3-triethoxysilylpropylmethacrylate monosulfide, and 3-trimethoxysilylpropylmethacrylate monosulfide; mercapto-type silane coupling agents such as 3-mercaptopropyltrimethoxysilane, 3-mercaptopropyltriethoxysilane, 2-mercaptoethyltrimethoxysilane, and 2-mercaptoethyltriethoxysilane; vinyl-type silane coupling agents such as vinyltriethoxysilane and vinyltrimetoxysilane; amino-type silane coupling agents such as 3-aminopropyltriethoxysilane, 3-aminopropyltrimethoxysilane, 3-(2-aminoethyl)aminopropyltriethoxysilane, and 3-(2-aminoethyl)aminopropyltrimethoxysilane; glycidoxy-type silane coupling agents such as γ-glycidoxypropyltriethoxysilane, γ-glycidoxypropyltrimetoxysilane, γ-glycidoxypropylmethyldietoxysilane, and γ-glycidoxypropylmethyldimethoxysilane; nitro-type silane coupling agents such as 3-nitropropyltrimethoxysilane and 3-nitropropyltriethoxysilane; chloro-type silane coupling agents such as 3-chloropropyltrimetoxysilane, 3-chloropropyltriethoxysilane, 2-chloroethyltrimethoxysilane, and 2-chloroethyltriethoxysilane; and the like. Examples of trade names thereof include: Si69, Si75 and Si363 (each produced by Degussa AG); NXT, NXT-LV, NXT-ULV, and NXT-Z (each produced by Momentive Performance Materials Inc.); and the like.

The amount of the silane coupling agent is preferably 3 parts by weight or more, and more preferably 8 parts by weight or more, per 100 parts by weight of the silica. When the amount of the silane coupling agent is less than 3 parts by weight, breaking strength tends to decrease significantly. The amount of the silane coupling agent is preferably 15 parts by weight or less, and more preferably 10 parts by weight or less, per 100 parts by weight of the silica. When the amount of the silane coupling agent exceeds 15 parts by weight, the effects of adding a silane coupling agent, such as increase in breaking strength and decrease in rolling resistance, tend not to be exerted.

In addition to the rubber component, the silica and the silane coupling agent, the rubber composition of the present invention may optionally contain compounding ingredients commonly used in production of rubber compositions, in a commonly used amount. Examples of the compounding ingredients include: reinforcing fillers such as carbon black and clay, antioxidants, zinc oxide, stearic acid, aromatic oil, waxes, vulcanizing agents such as sulfur, and vulcanization accelerators, and the like.

When the rubber composition of the present invention contains carbon black, the nitrogen adsorption specific surface area ($N_2SA$) of carbon black is preferably 30 m$^2$/g or more, and more preferably 40 m$^2$/g or more. When the $N_2SA$ is less than 30 m$^2$/g, rubber reinforcement and abrasion resistance tend to be insufficient. The $N_2SA$ of carbon black is preferably 100 m$^2$/g or less, and more preferably 90 m$^2$/g or less. When the $N_2SA$ exceeds 100 m$^2$/g, dispersibility of carbon black tends to be poor, likely resulting in high heat build-up. Examples of the carbon black include HAF, FEF and the like.

The amount of carbon black is preferably 2 parts by weight or more, and more preferably 5 parts by weight or more, per 100 parts by weight of the rubber component. The amount thereof is preferably 40 parts by weight or less, and more preferably 20 parts by weight or less, per 100 parts by weight of the rubber component. The amount of less than 2 parts by weight tends to deteriorate processability. On the other hand, when the amount exceeds 40 parts by weight, low heat build-up property tends to be poor.

Commonly known methods can be employed as the method for producing the rubber composition of the present invention, and for example, the rubber composition can be produced by mixing the respective ingredients mentioned above with use of a rubber kneader such as a Banbury mixer or an open roll mill.

The rubber composition is applicable to a tread. The tread can be prepared by, for example, laminating sheets of the rubber composition with each other into a predetermined shape, or inserting the rubber composition into two or more extruders to form a two-layer sheet at the head exit of the extruders.

The present invention also relates to a tire having a tread prepared using the rubber composition of the present invention, and the tire may be produced by a usual method with use of the rubber composition. More specifically, the rubber composition of the present invention prepared by blending the aforementioned chemical agents according to necessity is extruded and processed into a shape of tread at an unvulcanized stage and then assembled with other tire components in a usual manner on a tire building machine to obtain an unvulcanized tire. Then, the unvulcanized tire is subjected to heating and pressing in a vulcanizer to obtain the tire of the present invention. The thus-obtained tire of the present invention is excellent in low heat build-up property and wet grip performance.

EXAMPLES

The present invention will be specifically described according to examples, and is not intended to be limited only by these examples.

In the following, respective chemical agents used for the synthesis of Monomer (1) are listed.

Cyclohexane: cyclohexane (produced by Kanto Chemical Co., Inc.)

Pyrrolidine: pyrrolidine (produced by Kanto Chemical Co., Inc.)

Divinylbenzene: divinylbenzene (produced by Sigma-Aldrich Japan K. K.)

1.6 M n-Butyl lithium in hexane: 1.6 M solution of n-butyl lithium in hexane (produced by Kanto Chemical Co., Inc.)

Isopropanol: isopropanol (produced by Kanto Chemical Co., Inc.)

Production Example 1

Synthesis of Monomer (1)

To a 100 ml container in which the air therein was sufficiently substituted with nitrogen were added 50 ml of cyclohexane, 4.1 ml (3.6 g) of pyrrolidine, and 6.5 g of divinylbenzene. Thereto was further added 0.7 ml of 1.6 M n-butyl lithium in hexane at 0° C., and the mixture was stirred. After 1 hour, isopropanol was added to the mixture to stop the reaction, and then extraction and purification were performed to give Monomer (1).

In the following, respective chemical agents used for the synthesis of Polymers (1) and (2) are listed.

Cyclohexane: cyclohexane (produced by Kanto Chemical Co., Inc.)

Butadiene: 1,3-butadiene (produced by Takachiho Chemical Industrial Co., Ltd.)

Tetramethylethylenediamine: N,N,N',N'-tetramethylethylenediamine (produced by Kanto Chemical Co., Inc.)

1.6 M n-Butyl lithium in hexane: 1.6 M solution of n-butyl lithium in hexane (produced by Kanto Chemical Co., Inc.)

Terminal-modifying agent: 3-(N,N-dimethylaminopropyl)trimethoxysilane (produced by AZmax Co., Ltd.)

Isopropanol: isopropanol (produced by Kanto Chemical Co., Inc.)

Production Example 2

Synthesis of Polymer (1))

To a 1000 ml pressure-resistant container in which the air therein was sufficiently substituted with nitrogen were added 600 ml of cyclohexane, 71.0 ml (41.0 g) of butadiene, 0.29 g of Monomer (1), and 0.11 ml of tetramethylethylenediamine. Thereto was further added 0.2 ml of 1.6 M n-butyl lithium in hexane at 40° C., and the mixture was stirred. After 3 hours, 3 ml of isopropanol was added to the mixture to stop the polymerization. After adding 1 g of 2,6-tert-butyl-p-cresol to the reaction solution, the solution was subjected to a reprecipitation treatment with methanol, and heated and dried to give Polymer (1).

Production Example 3

Synthesis of Polymer (2)

To a 1000 ml pressure-resistant container in which the air therein was sufficiently substituted with nitrogen were added 600 ml of cyclohexane, 71.0 ml (41.0 g) of butadiene, 0.29 g of Monomer (1), and 0.11 ml of tetramethylethylenediamine. Thereto was further added 0.2 ml of 1.6 M n-butyl lithium in hexane at 40° C., and the mixture was stirred. After 3 hours, 0.5 ml (0.49 g) of 3-(N,N-dimethylaminopropyl)trimethoxysilane (a modifying agent) was added to the mixture and stirred. After 1 hour, 3 ml of isopropanol was added to the mixture to stop the polymerization. After adding 1 g of 2,6-tert-butyl-p-cresol to the reaction solution, the solution was subjected to a reprecipitation treatment with methanol, and heated and dried to give Polymer (2).

(Measurement of Weight-Average Molecular Weight (Mw))

The weight-average molecular weight (Mw) was measured using an apparatus of GPC-8000 series produced by TOSOH CORPORATION with a differential refractometer as a detector, and the molecular weight was calibrated relative to polystyrene standards.

(Measurement of Amount of Nitrogen-Containing Compound Monomer In Polymer)

The amount of nitrogen-containing compound monomer in a polymer was measured using an apparatus of JNM-ECA series available from JEOL Ltd.

Examples 1 to 8 and Comparative Examples 1 to 3

In the following, respective chemical agents used in Examples and Comparative Examples are listed.

Styrene butadiene rubber (SBR): E15 (produced by Asahi Kasei Chemicals Corporation)

Polymer (1): main chain-modified BR (produced in Production Example 2, vinyl content: 18% by weight, Mw: 300,000, amount of nitrogen-containing compound monomer: 2% by weight)

Polymer (2): main chain- and terminal-modified BR (produced in Production Example 3, vinyl content: 18% by weight, Mw: 300,000, amount of nitrogen-containing compound monomer: 2% by weight)

NR: RSS#3

Silica: ULTRASIL VN3 (produced by Degussa AG, $N_2SA$: 170 $m^2/g$)

Carbon black: SEAST NH (produced by Tokai Carbon Co., Ltd., $N_2SA$: 74 $m^2/g$)

Silane coupling agent: Si75 (produced by Degussa AG, bis(3-triethoxysilylpropyl)disulfide)

Zinc oxide: zinc white No. 1 (produced by Mitsui Mining & Smelting Co., Ltd.)

Stearic acid: stearic acid "Tsubaki" (produced by NOF Corporation)

Antioxidant: Antigene 6C (produced by Sumitomo Chemical Co., Ltd., N-(1,3-dimethylbutyl)-N'-phenyl-p-phenylenediamine)

Wax: SUNNOC N (produced by Ouchi Shinko Chemical Industrial Co., Ltd.)

Aromatic oil: Process X-140 (produced by Japan Energy Corporation)

Sulfur: sulfur powder (produced by Karuizawa Iou K.K.)

Vulcanization accelerator (1): Nocceler CZ (produced by Ouchi Shinko Chemical Industrial Co., Ltd., N-cyclohexyl-2-benzothiazolylsulfenamide)

Vulcanization accelerator (2): Nocceler D (produced by Ouchi Shinko Chemical Industrial Co., Ltd., N,N'-diphenylguanidine)

According to the blending formulations shown in Table 1, the chemical agents were mixed to give the respective rubber compositions. Test tires (size: 195/65R15) were produced using each of these rubber compositions for a tread of tire, and were subjected to the following tests.

(Rolling Performance)

Using a rolling resistance tester, rolling resistance of a test tire was determined under the conditions of: a rim of 15×6JJ, an internal pressure of 230 kPa, a load of 3.43 kN, and a speed of 80 km/h, and was expressed as an index based on the value of Comparative Example 1, which was regarded as 100. The smaller index value of rolling resistance means the better rolling performance.

(Wet Grip Performance)

The braking distance from an initial braking speed of 100 km/h was measured on a wet asphalt road surface. The result was expressed as an index, and the larger index value means the better wet skid resistance (wet grip performance). The index was calculated by the following equation.

(Wet skid resistance)=(Braking distance of Comparative Example 1)/(Braking distance of each of Examples and Comparative Examples)×100

TABLE 1

|  |  | Examples | | | | | | | | Comparative Examples | | |
|---|---|---|---|---|---|---|---|---|---|---|---|---|
|  |  | 1 | 2 | 3 | 4 | 5 | 6 | 7 | 8 | 1 | 2 | 3 |
| Formulation (part(s) by weight) | SBR | 60 | 45 | 30 | 60 | 45 | 30 | 45 | 45 | 70 | 20 | 20 |
|  | Polymer (1) | 10 | 25 | 40 | — | — | — | — | — | — | 50 | — |
|  | Polymer (2) | — | — | — | 10 | 25 | 40 | 25 | 25 | — | — | 50 |
|  | NR | 30 | 30 | 30 | 30 | 30 | 30 | 30 | 30 | 30 | 30 | 30 |
|  | Silica | 75 | 75 | 75 | 75 | 75 | 75 | 90 | 105 | 75 | 75 | 75 |
|  | Carbon black | 10 | 10 | 10 | 10 | 10 | 10 | 10 | 10 | 10 | 10 | 10 |
|  | Silane coupling agent | 6 | 6 | 6 | 6 | 6 | 6 | 6 | 6 | 6 | 6 | 6 |
|  | Zinc oxide | 3 | 3 | 3 | 3 | 3 | 3 | 3 | 3 | 3 | 3 | 3 |
|  | Stearic acid | 2 | 2 | 2 | 2 | 2 | 2 | 2 | 2 | 2 | 2 | 2 |
|  | Antioxidant | 2 | 2 | 2 | 2 | 2 | 2 | 2 | 2 | 2 | 2 | 2 |
|  | Wax | 2 | 2 | 2 | 2 | 2 | 2 | 2 | 2 | 2 | 2 | 2 |
|  | Aromatic oil | 20 | 20 | 20 | 20 | 20 | 20 | 30 | 40 | 20 | 20 | 20 |
|  | Sulfur | 2 | 2 | 2 | 2 | 2 | 2 | 2 | 2 | 2 | 2 | 2 |
|  | Vulcanization accelerator (1) | 1.5 | 1.5 | 1.5 | 1.5 | 1.5 | 1.5 | 1.5 | 1.5 | 1.5 | 1.5 | 1.5 |
|  | Vulcanization accelerator (2) | 1.2 | 1.2 | 1.2 | 1.2 | 1.2 | 1.2 | 1.2 | 1.2 | 1.2 | 1.2 | 1.2 |
| Evaluation result | Index of rolling resistance | 98 | 95 | 92 | 98 | 94 | 91 | 97 | 100 | 100 | 90 | 89 |
|  | Index of wet grip performance | 100 | 100 | 100 | 100 | 100 | 100 | 105 | 110 | 100 | 95 | 95 |

The results of Table 1 show that in Examples in which the modified BR according to the present invention was used for a tread, the tires exhibited favorable rolling resistance performance and a suitable balance between the rolling resistance performance and wet grip performance in comparison with the tires of Comparative Example 1 in which SBR was used instead. The results also revealed that particularly when the terminal-modified copolymer was used, the rolling resistance performance was more improved, and the balance between both performances was still better (Examples 4 to 6). In Comparative Examples 2 and 3 in which the amounts of the modified BR were large, wet grip performance was inferior.

The invention claimed is:

1. A rubber composition comprising:
   silica and
   a rubber component that contains a modified butadiene rubber having a vinyl content of 35% by weight or less and having, in a main chain thereof, a constitutional unit derived from a nitrogen-containing compound represented by the formula:

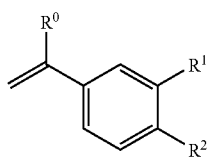

wherein $R^1$ and $R^2$ are each hydrogen, the formula:

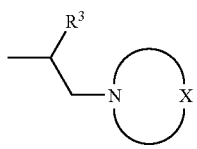

or the formula:

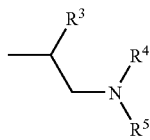

provided that at least one of $R^1$ and $R^2$ is not hydrogen,
$R^3$ represents hydrogen or a $C_{1-4}$ hydrocarbon group,
X represents a saturated ring-forming part consisting of $(CR^8R^9)_l$, $(CR^{10}R^{11})_m$—$NR^{12}$—$(CR^{13}R^{14})_n$, $(CR^{10}R^{11})_m$—O—$(CR^{13}R^{14})_n$, or $(CR^{10}R^{11})_m$—S—$(CR^{13}R^{14})_n$,
X may be substituted with the formula:

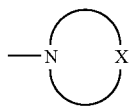

or the formula:

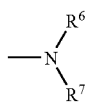

Z represents a saturated ring-forming part consisting of $(CR^8R^9)_l$, $(CR^{10}R^{11})_m$—$NR^{12}$—$(CR^{13}R^{14})_n$, $(CR^{10}R^{11})_m$—O—$(CR^{13}R^{14})_n$, or $(CR^{10}R^{11})_m$—S—$(CR^{13}R^{14})_n$,
$R^4$ to $R^7$ each represent hydrogen, a $C_{1-30}$ aliphatic hydrocarbon group, a $C_{3-30}$ alicyclic hydrocarbon group, a $C_{5-30}$ aromatic hydrocarbon group, or a heterocyclic group containing 3 to 30 annular atoms, and are the same as or different from each other,
$R^0$, and $R^8$ to $R^{14}$ each represent hydrogen, a $C_{1-30}$ aliphatic hydrocarbon group, a $C_{3-30}$ alicyclic hydrocarbon group, or a $C_{5-30}$ aromatic hydrocarbon group, and are the same as or different from each other, and
l represents an integer of 3 to 10, and m and n each represent an integer of 1 to 9, wherein the modified butadiene rubber consists essentially of constitutional units derived from butadiene and the constitutional units derived from the nitrogen-containing compounds, wherein an amount of the modified butadiene rubber is 5 to 45% by weight per 100% by weight of the rubber component, and wherein an amount of the silica is 10 to 150 parts by weight per 100 parts by weight of the rubber component.

2. The rubber composition according to claim 1,
wherein the modified butadiene rubber has at least one terminal further modified with a modifying agent having a functional group that contains at least one atom selected from the group consisting of nitrogen, oxygen and silicon.

3. A tire comprising
a tread prepared using the rubber composition according to claim 1.

4. The rubber composition according to claim 1, wherein $R^0$ and $R^8$ to $R^{14}$ each represent hydrogen, a $C_{1-5}$ aliphatic hydrocarbon group, a $C_{3-10}$ alicyclic hydrocarbon group, or a $C_{5-10}$ aromatic hydrocarbon group, and wherein $R^4$ to $R^7$ each represent hydrogen, a $C_{1-10}$ aliphatic hydrocarbon group, a $C_{3-10}$ alicyclic hydrocarbon group, a $C_{5-10}$ aromatic hydrocarbon group, or a heterocyclic group containing 3 to 10 annular atoms.

5. The rubber composition according to claim 1, wherein $R^0$ and $R^8$ to $R^{14}$ are each hydrogen or a $C_{1-2}$ aliphatic hydrocarbon group, and wherein $R^4$ to $R^7$ are each a $C_{1-10}$ aliphatic hydrocarbon group, a $C_{5-10}$ aromatic hydrocarbon group, or a heterocyclic group containing 3 to 10 annular atoms.

6. The rubber composition according to claim 1, where 1 represents an integer of 3 to 7 and m and n each represent an integer of 1 to 6.

7. The rubber composition according to claim 1, wherein the amount of the nitrogen-containing compound in the modified butadiene rubber is 0.05 to 30% by weight.

8. The rubber composition according to claim 1, wherein the weight-average molecular weight of the modified butadiene rubber is $1.0 \times 10^5$ to $2.0 \times 10^6$.

9. The rubber composition according to claim 1, further comprising 2 to 40 parts by weight of carbon black per 100 parts by weight of the rubber component.

10. The rubber composition according to claim 9, wherein the nitrogen adsorption specific surface area of the carbon black is 30 to 100 $m^2/g$.

* * * * *